(12) United States Patent
Wolner et al.

(10) Patent No.: US 7,281,620 B2
(45) Date of Patent: Oct. 16, 2007

(54) SELF-RETRACTING LIFELINE

(75) Inventors: J. Thomas Wolner, Red Wing, MN (US); Scott C. Casebolt, St. Paul Park, MN (US)

(73) Assignee: D B Industries, Inc., Red Wing, MN (US)

( * ) Notice: Subject to any disclaimer, the term of this patent is extended or adjusted under 35 U.S.C. 154(b) by 241 days.

(21) Appl. No.: 10/914,631

(22) Filed: Aug. 9, 2004

(65) Prior Publication Data

US 2005/0051659 A1 Mar. 10, 2005

Related U.S. Application Data

(60) Provisional application No. 60/500,491, filed on Sep. 5, 2003.

(51) Int. Cl.
*B65H 75/30* (2006.01)
*B65H 75/48* (2006.01)

(52) U.S. Cl. .................. 192/223.1; 29/434; 242/383.5

(58) Field of Classification Search ............. 192/223.1; 242/383.5; 188/82.77; 182/231
See application file for complete search history.

(56) References Cited

U.S. PATENT DOCUMENTS 2,268,243 A 12/1941 Curtis

| 3,879,016 | A | | 4/1975 | Kankkunen |
| 4,177,962 | A | * | 12/1979 | Hildebrandt ............. 242/383.5 |
| 4,589,523 | A | | 5/1986 | Olson et al. |
| 4,877,110 | A | | 10/1989 | Wolner |
| 5,070,978 | A | | 12/1991 | Pires |
| 5,186,289 | A | | 2/1993 | Wolner |
| 5,287,950 | A | | 2/1994 | Feathers et al. |
| 5,722,612 | A | * | 3/1998 | Feathers ..................... 192/223 |
| 6,283,398 | B1 | | 9/2001 | Specht |
| 6,523,771 | B2 | * | 2/2003 | Sumiyashiki ............. 242/383.5 |

FOREIGN PATENT DOCUMENTS

| EP | 0 247 818 A2 | 12/1987 |
| GB | 238302 | 8/1925 |
| WO | WO97/12786 | 4/1997 |

* cited by examiner

*Primary Examiner*—Rodney H. Bonck
(74) *Attorney, Agent, or Firm*—IPLM Group, P.A.

(57) ABSTRACT

A preferred embodiment self-retracting lifeline (100) includes a centrifugal clutch assembly (121) having a pawl (128) and a spring (131). The pawl (128) and the spring (131), which do not require any fixed attachment to any other component of the device, are held in place and pivotable within a plate (143). The plate (143) is rotatable within a cavity (120) of a brake hub (118) including teeth (141) extending into the cavity (120). When a centrifugal force is applied, the pawl (128) compresses the spring (131) and moves away from the plate (143) to engage the teeth (141) thereby activating a brake assembly within the self-retracting lifeline (100).

14 Claims, 2 Drawing Sheets

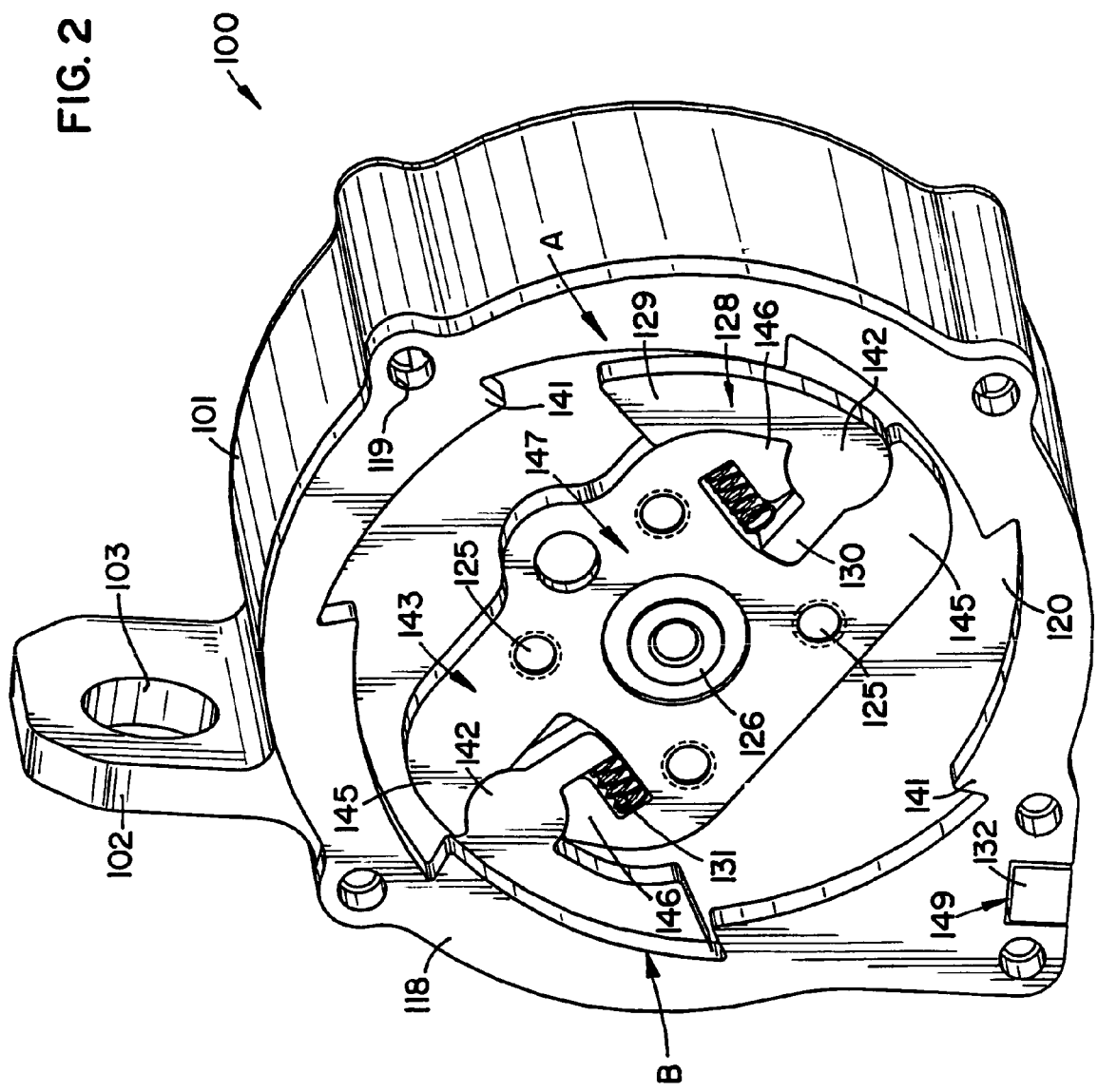

SELF-RETRACTING LIFELINE

This application claims the benefit of U.S. Provisional Application No. 60/500,491, filed Sep. 5, 2003.

BACKGROUND OF THE INVENTION

1. Field of the Invention

The present invention relates to a self-retracting lifeline for use with fall protection safety equipment.

2. Description of the Prior Art

Self-retracting lifelines are well known in the art of fall protection safety equipment for use by workers performing tasks during which there is a risk a fall may occur. Self-retracting lifelines generally include a housing containing a drum around which a cable, rope, or webbing is wound. The drum is spring biased to pay out cable as tension pulling the cable is applied and to retract any of the cable that has been unwound from the drum as the tension on the cable is reduced or released. The housing also includes a brake assembly for stopping rotation of the drum when the cable suddenly unwinds from the drum at a rate greater than a predetermined maximum angular velocity.

A self-retracting lifeline is typically connected to a support structure within the vicinity the worker is performing the task, and the end of the cable is typically connected to a safety harness worn by the worker. The cable is easily drawn out of the self-retracting lifeline housing as the worker moves away from the device, and the cable is automatically drawn back into the housing as the worker moves toward the device. Should a fall occur, the brake assembly within the device is automatically engaged by a centrifugal clutch assembly, which gradually and quickly stops the worker's fall by gradually and quickly stopping the rotation of the drum. As the rotation of the drum is stopped, additional cable is prevented from being paid out of the housing to stop the fall of the worker.

SUMMARY OF THE INVENTION

A preferred embodiment centrifugal clutch assembly for use with a self-retracting lifeline has a brake hub with ratcheting teeth within a cavity of the brake hub and a plate with a first end and a second end. The first end and the second end each have a first portion and a second portion defining an inlet portion. A pawl is configured and arranged to be placed within the inlet portion between the first portion and the second portion on each end of the plate, and the inlet portion provides a cavity within which the pawl is kept in place by the first portion and the second portion. The pawl is pivotable proximate the first portion and the second portion. A spring is configured and arranged to be placed within the inlet portion between the second portion and the pawl, the second portion and the pawl keeping the spring in place within the inlet portion, and the spring placing a biasing force upon the pawl.

A preferred embodiment centrifugal clutch assembly for use with a self-retracting lifeline includes a plate having an end with a first portion and a second portion. The first portion and the second portion define an inlet portion, and the inlet portion extends from the end toward a central portion of the plate. A pawl has a base portion, an intermediate portion, and an extension portion. The intermediate portion interconnects the base portion and the extension portion, and the intermediate portion is configured and arranged to be placed between the first portion and the second portion. The first portion and the second portion keep the intermediate portion in place while allowing the pawl to be pivotable therein proximate the intermediate portion. The base portion extends outward from the intermediate portion and away from the inlet portion. The extension portion extends outward from the intermediate portion and into the inlet portion. A spring is configured and arranged to be placed within the inlet portion between the second portion of the plate and the extension portion of the pawl, the spring biasing the pawl.

A preferred embodiment centrifugal clutch assembly for use with a self-retracting lifeline includes a hub having a cavity and teeth, the teeth extending into the cavity. A plate has an end with a first portion and a second portion. The plate is configured and arranged to fit within the hub. The first portion and the second portion define an inlet portion, the inlet portion extending from the end toward a central portion of the plate. A pawl has a base portion, an intermediate portion, and an extension portion. The intermediate portion interconnects the base portion and the extension portion. The intermediate portion is configured and arranged to be placed between the first portion and the second portion. The first portion and the second portion keep the intermediate portion in place while allowing the pawl to be pivotable therein proximate the intermediate portion. The base portion extends outward from the intermediate portion into the cavity of the hub, the extension portion extending outward from the intermediate portion into the inlet portion. A spring is configured and arranged to be placed within the inlet portion between the second portion of the plate and the extension portion of the pawl. The spring biases the pawl, wherein a centrifugal force causes the extension portion to compress the spring thereby causing the pawl to pivot, wherein the base portion moves away from the plate and engages the teeth of the hub.

A preferred embodiment brake assembly includes an enclosure defining boundaries of a confinement cavity, a pawl, and a spring. The pawl and the spring are contained within the boundaries of the confinement cavity by the enclosure absent interconnections. The enclosure holds the pawl and the spring in place from movement in a first direction and from movement in a second direction. The first direction and the second direction are generally perpendicular to one another.

A preferred embodiment brake assembly includes a hub having a cavity and teeth, the teeth extending into the cavity. A plate has an end with a first portion and a second portion, and the plate is configured and arranged to fit within the hub. The first portion and the second portion define an inlet portion, and the inlet portion extends from the end toward a central portion of the plate. A drum is operatively connected to the plate. A pawl has a base portion, an intermediate portion, and an extension portion. The intermediate portion interconnects the base portion and the extension portion, and the intermediate portion is configured and arranged to be placed between the first portion and the second portion. The first portion and said second portion keep the intermediate portion in place while allowing the pawl to be pivotable therein proximate the intermediate portion. The base portion extends outward from the intermediate portion into the cavity of the hub, the extension portion extending outward from the intermediate portion into the inlet portion. A spring is configured and arranged to be placed within the inlet portion between the second portion of the plate and the extension portion of the pawl, the spring biasing the pawl, wherein a sudden acceleration causes the extension portion to compress the spring thereby causing the pawl to pivot, wherein the base portion moves away from the plate and engages the teeth of the hub thereby braking the drum.

BRIEF DESCRIPTION OF THE DRAWINGS

FIG. 2 is a top view of the self-retracting lifeline shown in FIG. 1 with two plate members removed to show a centrifugal clutch assembly.

DETAILED DESCRIPTION OF A PREFERRED EMBODIMENT

Figure 1:
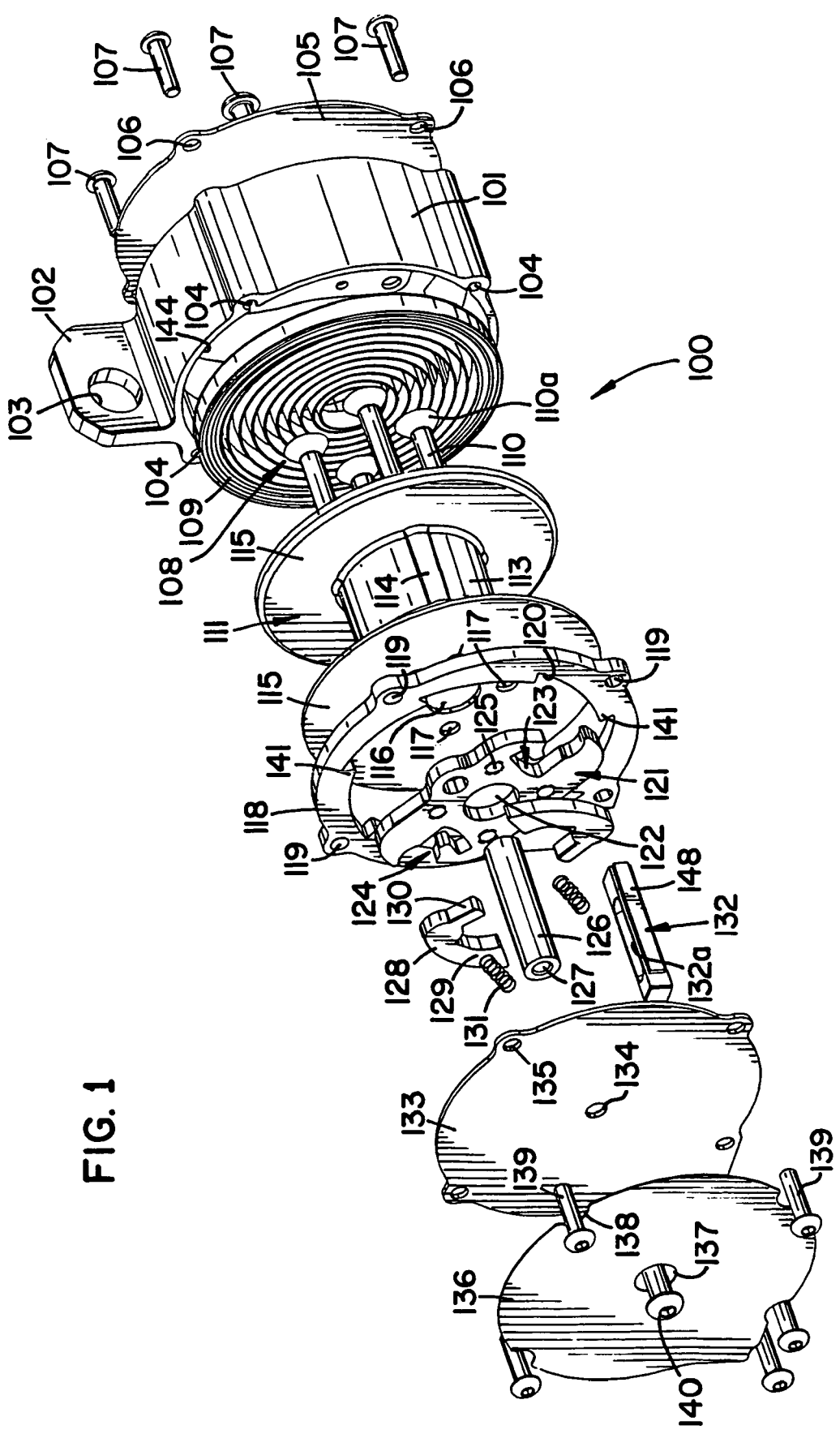
FIG. 1 is an exploded perspective view of a self-retracting lifeline constructed according to the principles of the present invention.

With reference to the drawings, a preferred embodiment self-retracting lifeline constructed according to the principles of the present invention is referenced by the numeral 100.

As shown in FIGS. 1 and 2, the preferred embodiment self-retracting lifeline 100 includes a housing 101, which is preferably cylindrical in shape with a cavity 144. A tab 102 extends outwardly from the housing 101. Tab 102 includes an aperture 103 to enable the self-retracting lifeline 100 to be connected to a support structure (not shown) by a hook (not shown) or other suitable fasteners well known in the art. Within the cylindrical wall of the housing 101, extending longitudinally therethrough, there are preferably four bores 104. The bores 104 are spaced approximately evenly around the housing 101 and are configured and arranged to engage bolts 107. A back plate member 105 is configured and arranged to cover one end of the housing 101 and includes apertures 106, which are in alignment with the bores 104. The bolts 107 connect the back plate member 105 to the housing 101 by engaging apertures 106 and bores 104, respectively. A spring assembly 108 fits within the cavity 144 of the housing 101. The spring assembly 108 includes a spiral motor spring 109 with an inner end (not shown) and an outer end (not shown).

A drum 111, which resembles a spool, includes a cylinder portion 113 and a rim 115 on each end of the cylinder portion 113. A bore 116 extends longitudinally through the center of the cylinder portion 113, and four bores 117 extend longitudinally through the cylinder portion 113 about the bore 116. The bores 117 form ribs 114 along the cylinder portion 113. The bores 117 are preferably countersunk on one side (not shown) and are configured and arranged to engage bolts 110 with heads 110a. The heads 110a fit within the countersunk portions of the bores 117 so as to not interfere with operation of the self-retracting lifeline 100. The rim 115 facing the housing 101 includes a boss (not shown), which extends outward around the bore 116. The boss includes a slot (not shown) therein. The drum 111 is also configured and arranged to fit within the cavity 144 of the housing 101.

A brake assembly includes a brake hub 118 and a centrifugal clutch assembly 121. The brake hub 118 is generally ring-shaped to form a cavity 120. Proximate the perimeter of the brake hub 118 are apertures 119, which are in alignment with bores 104. Ratcheting catches or teeth 141 extend from the brake hub 118 into the cavity 120.

The centrifugal clutch assembly 121 includes a plate 143, pawls 128, and springs 131. The plate 143 is generally an oval-shaped disk including a finger portion 145 and a hook portion 146 at each end. An aperture 122 proximate the center of the plate 143 is in alignment with bore 116, and apertures 125 are arranged about aperture 122 in alignment with bores 117. The aperture 122 and the apertures 125 form a central, generally circular, portion 147 of the plate 143. The finger portions 145 and the hook portions 146 extend from the central portion 147 of the plate 143 to form the generally oval-shaped disk. Between the finger portions 145 and the hook portions 146 are inlet portions 124, which include expanded inlet portions 123. The finger portions 145 extend outward proximate one side of each end, and the hook portions 146 extend outward and then inward toward the finger portions 145 proximate the opposite side of each end. The finger portions 145 extend outward to the end of the plate 143, but the hook portions 146 do not extend outward to the end of the plate 143. The hook portions 146 extend outward approximately half the distance of the finger portions 145 before they extend inward toward the finger portions 145. Each end is basically a mirror image of the other end so the finger portions 145 are diagonal from one another and the hook portions 146 are diagonal from one another.

The inlet portions 124 and the expanded inlet portions 123 are notches in the plate 143 between the finger portions 145 and the hook portions 146. The inlet portions 124 are approximately ½ to ⅓ the width of the plate 143 and extend from proximate the middle of each end to proximate midway to the aperture 122. The expanded inlet portions 123 extend from the end of the inlet portions 124 proximate midway to the aperture 122 inward toward the hook portions 146. In other words, the inlet portions 124 and the expanded inlet portions 123 coordinate to define the shapes of the finger portions 145 and the hook portions 146 and to form notches within which the springs 131 and portions the pawls 128 are arranged.

The pawls 128 each include a base portion 129, an intermediate portion 142, and an extension portion 130. The intermediate portion 142 is generally circular in shape, and the base portion 129 extends from one side and the extension portion 130 extends from another, generally opposite side of the intermediate portion 142. The base portion 129 is preferably curved to form an arc-shape. As shown in FIGS. 1 and 2, the intermediate portion 142 and the base portion 129 resemble a mirror image of a comma. The extension portion 130 is generally rectangular and extends generally 90° from the base portion 129.

The inlet portion 124 is configured and arranged to receive the intermediate portion 142, which may pivot therein. The extension portion 130 extends into the expanded inlet portion 123, and the base portion 129 extends outward from the inlet portion 124. The arc-shape of the base portion 129 coordinates with the finger portion 145 and the hook portion 146. The top of the arc-shape of the base portion 129 follows the line of the curvature of the end of the finger portion 145 (and the end of the plate 143), and the bottom of the arc-shape follows the curvature of the hook portion 146. The top of the arc-shape is like an extension of the finger portion 145, and the bottom of the arc-shape fits around the hook portion 146. Springs 131 are configured and arranged to fit within the expanded inlet portions 123 between the hook portions 146 and the extension portions 130. In a first position A, the spring 131 provides a constant force upon the extension portion 130 thereby pushing the extension portion 130 against the finger portion 145 and the base portion 129 against the hook portion 146. In a second position B, the force of the spring 130 is overcome by the extension portion 130 to compress the spring 130 thereby pivoting the pawl 128 so that the extension portion 130 moves toward the hook portion 146 and the base portion 129 moves away from the hook portion 146. The first position A allows the pawl 130 to bypass the ratcheting teeth 141 of the brake hub 118 while the second position B allows the pawl 130 to engage the ratcheting teeth 141 of the brake hub 118. Positions A and B are shown in FIG. 2.

A shaft 126 having a longitudinal bore 127 is configured and arranged to fit within aperture 122, bore 116, and into cavity 144 proximate the inner end of the spiral motor spring 109. The inner end of the spiral motor spring 109 is inserted into the slot of the boss in rim 115 and is operatively connected thereto, keeping the inner end stationary. The boss is larger in diameter than the shaft 126 and is preferably as thick as the spiral motor spring 109. The outer end of the spiral motor spring 109 is operatively connected to the inner surface of the housing 101 by means well known in the art. The spiral motor spring 109 coils more or less tightly in response to rotation of the drum 111 as the webbing is unwound from and wound about the drum 111. The spiral motor spring 109 maintains a continuous turning force on the drum 111 so that the webbing is continuously urged to be wound about the drum 111.

A plate member 133, which is similarly configured and arranged as back plate member 105, covers the other end of the housing 101 and includes apertures 135, which are in alignment with the apertures 119 and bores 104. The plate member 133 also includes an aperture 134 in alignment with bore 127. A front plate member 136 may also be used and includes notches 138 in alignment with apertures 135 and an aperture 137 in alignment with aperture 134. The front plate member 136 may be a label. Bolts 139 operatively connect the front plate member 136, the plate member 133, the brake hub 118, and the housing 101 by engaging the notches 138, the apertures 135, the apertures 119, and the bores 104, respectively. Bolt 140 is inserted through apertures 137 and 134 to engage bore 127.

A rectangular webbing guide 132 includes an elongate aperture 132a configured and arranged to allow webbing (not shown) to extend from the drum 111 out of the housing 101 through the aperture 132a. Raised portions 148 extend from each side of the webbing guide 132 and fit within a notch 149 in the housing 101. The webbing guide 132 is then held in place between the back plate member 105 and the plate member 133.

The webbing (not shown) includes a first end, a second end, and an intermediate portion therebetween. Although the preferred embodiment utilizes webbing, it is recognized that cable, rope, or other suitable elongate member may be used. The webbing serves as the lifeline of the self-retracting lifeline 100. The intermediate portion is wound onto and off of the cylinder portion 113 of the drum 111, and the rims 115 on either side of the cylinder portion 113 keep the webbing on the cylinder portion 113. The first end of the webbing is fixedly operatively connected by means well known in the art to the drum 111. For example, one such way is shown and described in U.S. Pat. No. 5,186,289, which is incorporated by reference herein. The second end of the webbing extends through the housing 101 and is operatively connected to a fastening device (not shown) such as a snap hook.

In operation, the self-retracting lifeline 100 is operatively connected to a support structure, and the webbing is operatively connected to a safety harness worn by a worker. The worker is free to move about the vicinity of the self-retracting lifeline 100, with only the length of the webbing restricting the distance of the worker's movement. As the worker moves further away from the self-retracting lifeline 100, webbing is paid out of the device as it is unwound from the drum 111. As the worker moves closer to the self-retracting lifeline 100, webbing is retracted into the device as it is wound about the drum 111. In the event a fall should occur, the sudden acceleration or high rate of speed at which the drum 111 turns to pay out webbing causes the pawls 128 to overcome the force of the springs 131. The centrifugal force causes the pawls 128 to pivot away from the central portion 147 of the plate 143. The intermediate portion 142 rotates within the inlet portion 124, causing the extension portion 130 to pivot and compress the spring 131 and the base portion 129 to pivot away from the plate 143 and engage at least one of the ratcheting teeth 141 of the brake hub 118. Engagement of the brake hub 118 by the pawls 128 activates the rest of the brake assembly. Because the pawls 128 engage the ratcheting teeth 141 and can no longer rotate within cavity 120, the pawls 128 cause the brake hub 118 to rotate. The brake hub 118, which is rotatably mounted to shaft 126 but does not normally rotate about shaft 126, begins to rotate with the pawls 128 and the drum 111. Once pawls 128 have engaged ratcheting teeth 141, they cannot be disengaged until the drum 111 begins to rotate backward to rewind the webbing onto the cylinder portion 113.

One of the advantages of the present invention is the ease of manufacture and assembly of the self-retracting lifeline 100. In prior art self-retracting lifelines, the pawls include pins about which the pawls pivot and the pawls are fixedly attached to the springs, which are fixedly attached to another component. The present invention does not include pins on the pawls or fixedly attach the springs to any component. The pawls 128 and the springs 131 must only be placed within the appropriate spaces formed by the plate 143. As the self-retracting lifeline is being assembled, the pawls 128 and the springs 131 are simply dropped into place.

The rim 115, the plate member 133, the brake hub 118, and the plate 143 form an enclosure that defines boundaries of a confinement cavity, wherein the pawls 128 and the springs 131 are held in place from movement in a first direction by a front stop (rim 115) and a back stop (plate member 133). The pawls 128 are held in place from movement in a second direction generally perpendicular to the first direction by the brake hub 118 and the plate 143 between the finger portions 145 and the hook portions 146. The springs are held in place from movement in the second direction by the hook portions 146 of the plate 143 and the extension portions 130 of the pawls 128. The pawls 128 and the springs 131 are held in place by the boundaries of the confinement cavity. Therefore, the pawls 128 and the springs 131 do not require any interconnections such as pins or other fixed attachments well known in the art.

It is recognized that the centrifugal clutch assembly 121, including the plate 143, the pawls 128, and the springs 131, of the present invention is not limited to use with the preferred embodiment self-retracting lifeline 100 and may be used with any other suitable self-retracting lifeline well known in the art. For example, another such self-retracting lifeline with which the present invention may be used is U.S. Pat. No. 5,186,289, which has been incorporated by reference herein.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A centrifugal clutch assembly for use with a self-retracting lifeline having a brake hub with ratcheting teeth within a cavity of the brake hub and a plate with a first end and a second end, said first end and said second end each having a first portion and a second portion defining an inlet portion, comprising:

a) a pawl having a base portion, an intermediate portion, and an extension portion, said intermediate portion interconnecting said base portion and said extension portion, said intermediate portion configured and arranged to be placed within the inlet portion between the first portion and the second portion on each end of the plate, the inlet portion providing a cavity within which said pawl is kept in place by the first portion and the second portion absent interconnections, said pawl being pivotable proximate the first portion and the second portion, said intermediate portion being kept in place while allowing said pawl to be pivotable therein proximate said intermediate portion, said base portion extending outward from said intermediate portion and away from said inlet portion, said extension portion extending outward from said intermediate portion and into said inlet portion; and b) a spring configured and arranged to be kept in place within the inlet portion between the second portion and said extension portion of said pawl absent interconnections, the second portion and said pawl keeping said spring in place within the inlet portion, said spring placing a biasing force upon said pawl.

2. The centrifugal clutch assembly of claim 1, wherein said pawl is pivotable between a first position and a second position relative to the plate, said spring pushing said pawl toward the plate in the first position thereby bypassing the ratcheting teeth, said spring being compressed thereby allowing said pawl to pivot away from the plate in the second position thereby engaging the ratcheting teeth.

3. A centrifugal clutch assembly for use with a self-retracting lifeline, comprising:

a) a plate having an end with a first portion and a second portion, said first portion and said second portion defining an inlet portion, said inlet portion extending from said end toward a central portion of said plate;

b) a pawl having a base portion, an intermediate portion, and an extension portion, said intermediate portion interconnecting said base portion and said extension portion, said intermediate portion configured and arranged to be kept in place between said first portion and said second portion absent interconnections, said first portion and said second portion keeping said intermediate portion in place while allowing said pawl to be pivotable therein proximate said intermediate portion, said base portion extending outward from said intermediate portion and away from said inlet portion, said extension portion extending outward from said intermediate portion and into said inlet portion; and c) a spring configured and arranged to be kept in place within said inlet portion between said second portion of said plate and said extension portion of said pawl absent interconnections, said spring biasing said pawl.

4. The centrifugal clutch assembly of claim 3, further comprising an expanded inlet portion extending from said inlet portion proximate the central portion of said plate and toward said second portion of said plate, said expanded inlet portion being configured and arranged to receive said spring.

5. The centrifugal clutch assembly of claim 3, wherein said pawl is pivotable between a first position and a second position relative to the plate, said spring pushing said pawl toward the plate in the first position thereby bypassing the ratcheting teeth, said spring being compressed thereby allowing said pawl to pivot away from the plate in the second position thereby engaging the ratcheting teeth.

6. A centrifugal clutch assembly for use with a self-retracting lifeline, comprising:

a) a hub having a cavity and teeth, said teeth extending into said cavity;

b) a plate having an end with a first portion and a second portion, said plate configured and arranged to fit within said hub, said first portion and said second portion defining an inlet portion, said inlet portion extending from said end toward a central portion of said plate;

c) a pawl having a base portion, an intermediate portion, and an extension portion, said intermediate portion interconnecting said base portion and said extension portion, said intermediate portion configured and arranged to be kept in place between said first portion and said second portion absent interconnections, said first portion and said second portion keeping said intermediate portion in place while allowing said pawl to be pivotable therein proximate said intermediate portion, said base portion extending outward from said intermediate portion into said cavity of said hub, said extension portion extending outward from said intermediate portion into said inlet portion; and d) a spring configured and arranged to be kept in place within said inlet portion between said second portion of said plate and said extension portion of said pawl absent interconnections, said spring biasing said pawl, wherein a centrifugal force causes said extension portion to compress said spring thereby causing said pawl to pivot, wherein said base portion moves away from said plate and engages said teeth of said hub.

7. The centrifugal clutch assembly of claim 6, further comprising an expanded inlet portion extending from said inlet portion proximate the central portion of said plate and toward said second portion of said plate, said expanded inlet portion being configured and arranged to receive said spring.

8. The centrifugal clutch assembly of claim 6, wherein said pawl is pivotable between a first position and a second position relative to the plate, said spring pushing said pawl toward the plate in the first position thereby bypassing the ratcheting teeth, said spring being compressed thereby allowing said pawl to pivot away from the plate in the second position thereby engaging the ratcheting teeth.

9. A centrifugal clutch assembly for use with a self-retracting lifeline, comprising:

a) an enclosure defining boundaries of a confinement cavity consisting essentially of a front stop, a back stop, and a plate, the plate including a first portion and a second portion defining an inlet portion;

b) a pawl having a base portion, an intermediate portion, and an extension portion, the intermediate portion interconnecting the base portion and the extension portion, the intermediate portion configured and arranged to be kept in place within the confinement cavity between the first portion and the second portion, the confinement cavity providing a cavity within which the pawl is kept in place by the enclosure absent interconnections, the intermediate portion being kept in place while allowing the pawl to be pivotable therein proximate the intermediate portion, the base portion extending outward from the intermediate portion and away from the confinement cavity, the extension portion extending outward from the intermediate portion and into the confinement cavity; and c) a spring, the pawl and the spring being contained within the boundaries of the confinement cavity by the enclosure absent interconnections, the enclosure holding the pawl and the spring in place from movement in a first direction and from movement in a second direction, the first direction and the second direction being generally perpendicular to one another, the spring being configured and arranged to be kept in place within the confinement cavity between the second portion and the extension portion of the pawl, the pawl and the spring being kept in place in the first direction by the front and back stops, the pawl being kept in place in the second direction by the first and second portions, the spring being kept in place in the second direction by the second portion and the extension portion.

10. The centrifugal clutch assembly of claim 9, wherein the front stop is a rim and the back stop is a plate member, the pawl and the spring are held in place from movement in the first direction by the rim and the plate member, the pawl being held in place from movement in the second direction by the plate, the spring being held in place from movement in the second direction by the pawl and the plate.

11. The centrifugal clutch assembly of claim 9, wherein the front stop is a rim and the back stop is a plate member.

12. A centrifugal clutch assembly for use with a brake assembly including a hub and a drum, the hub having a cavity and teeth, the teeth extending into the cavity, comprising:
   a) a plate having an end with a first portion and a second portion, the plate configured and arranged to fit within the hub, the first portion and the second portion defining an inlet portion, the inlet portion extending from the end toward a central portion of the plate, the drum operatively connected to the plate;
   b) a pawl having a base portion, an intermediate portion, and an extension portion, the intermediate portion interconnecting the base portion and the extension portion, the intermediate portion configured and arranged to be kept in place between the first portion and the second portion absent interconnections, the first portion and the second portion keeping the intermediate portion in place while allowing the pawl to be pivotable therein proximate the intermediate portion, the base portion extending outward from the intermediate portion into the cavity of the hub, the extension portion extending outward from the intermediate portion into the inlet portion; and
   c) a spring configured and arranged to be kept in place within the inlet portion between the second portion of the plate and the extension portion of the pawl absent interconnections, the spring biasing the pawl, wherein a sudden acceleration causes the extension portion to compress the spring thereby causing the pawl to pivot, wherein the base portion moves away from the plate and engages the teeth of the hub thereby braking the drum.

13. The centrifugal clutch of claim 12, wherein boundaries of a confinement cavity hold the pawl and the spring in place from movement in a first direction and from movement in a second direction absent interconnections, the first direction and the second direction being generally perpendicular to one another.

14. A method of assembling a centrifugal clutch assembly for use with a brake assembly including a drum and a hub, the drum having a rim with a center portion and an outer portion, the hub having a cavity and teeth, the teeth extending into the cavity, the hub being connected to the rim proximate the outer portion with the teeth extending toward the center portion, comprising:
   a) connecting a plate to the rim of the drum proximate the center portion, the plate having a first portion and a second portion defining an inlet portion;
   b) placing an intermediate portion of a pawl between the first portion and the second portion of the plate, the intermediate portion of the pawl interconnecting a base portion and an extension portion, the base portion extending outward from the intermediate portion and away from the inlet portion, the extension portion extending outward from the intermediate portion and into the inlet portion;
   c) placing a spring between the second portion and the extension portion; and
   d) positioning a plate member proximate the plate thereby sandwiching the plate between the rim of the drum and the plate member, the pawl being kept in place in a first direction by the plate, the spring being kept in place in the first direction by the plate and the pawl, the pawl and the spring being kept in place in a second direction by the rim and the plate member.

* * * * *